United States Patent
Barck et al.

(10) Patent No.: US 8,261,091 B2
(45) Date of Patent: Sep. 4, 2012

(54) SOLID-STATE MEMORY-BASED GENERATION AND HANDLING OF SECURITY AUTHENTICATION TOKENS

(75) Inventors: Russell Barck, San Jose, CA (US); Jeremy Werner, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 1111 days.

(21) Appl. No.: 11/614,306

(22) Filed: Dec. 21, 2006

(65) Prior Publication Data

US 2008/0155271 A1    Jun. 26, 2008

(51) Int. Cl.
*G06F 21/00* (2006.01)

(52) U.S. Cl. ......... 713/189; 713/192; 713/193; 713/194

(58) Field of Classification Search ............ 713/189, 713/192, 193, 190, 191, 194, 500–503, 600; 380/35, 36, 255, 277
See application file for complete search history.

(56) References Cited

U.S. PATENT DOCUMENTS

| | | | | |
|---|---|---|---|---|
| 6,775,776 | B1* | 8/2004 | Vogt et al. | 713/186 |
| 6,904,493 | B2* | 6/2005 | Chiao et al. | 711/103 |
| 7,475,184 | B2* | 1/2009 | Lee | 711/103 |
| 7,496,957 | B2* | 2/2009 | Howard et al. | 726/14 |
| 2003/0055990 | A1* | 3/2003 | Cheline et al. | 709/229 |
| 2004/0010656 | A1* | 1/2004 | Chiao et al. | 711/103 |
| 2004/0117662 | A1* | 6/2004 | Ong | 713/202 |
| 2004/0177215 | A1* | 9/2004 | Nagamasa et al. | 711/103 |
| 2004/0232247 | A1* | 11/2004 | Tsunoda et al. | 235/492 |
| 2005/0210274 | A1* | 9/2005 | Frantz | 713/189 |
| 2005/0210287 | A1* | 9/2005 | Paatero | 713/201 |
| 2005/0216651 | A1* | 9/2005 | Tanabiki et al. | 711/100 |
| 2006/0053246 | A1* | 3/2006 | Lee | 711/100 |
| 2006/0138214 | A1* | 6/2006 | Aarons | 235/380 |
| 2007/0057763 | A1* | 3/2007 | Blattner et al. | 340/5.52 |
| 2007/0058812 | A1* | 3/2007 | Ali et al. | 380/274 |
| 2007/0091687 | A1* | 4/2007 | Armstrong et al. | 365/185.29 |
| 2007/0239990 | A1* | 10/2007 | Fruhauf et al. | 713/185 |
| 2007/0284436 | A1* | 12/2007 | Gland | 235/380 |
| 2008/0152133 | A1* | 6/2008 | Suga | 380/45 |
| 2008/0195641 | A1* | 8/2008 | Tischer et al. | 707/101 |

* cited by examiner

*Primary Examiner* — Edward Zee
*Assistant Examiner* — Sayed Beheshti Shirazi
(74) *Attorney, Agent, or Firm* — Turocy & Watson, LLP (57) ABSTRACT

An architecture is presented that facilitates secure token generation and transmission capabilities in a mobile device. The system comprises at least one software application that includes a secure token assigned to a specific user and a memory module that communicates with an external processor. A security processor, non-volatile memory component and volatile memory component are integrated to form the memory module that communicates with the external processor. The memory module creates a secure execution environment for the execution of application agents associated with the software application and the secure token. The security processor of the system communicates with the software application and external processor to manage generation, authentication, confidentiality, and transmission of the secure token. And, the non-volatile memory allows the introduction of new tokens and the removal of old tokens.

20 Claims, 10 Drawing Sheets

SOLID-STATE MEMORY-BASED GENERATION AND HANDLING OF SECURITY AUTHENTICATION TOKENS

BACKGROUND

Robust security is imperative for network-based systems, particularly for applications that deal with sensitive information, to prevent unauthorized agents from intercepting, corrupting or publishing sensitive data. A suitable information security system must perform with minimum disruption to users to ensure that authorized users are neither erroneously denied access nor unduly restricted in their duties.

Furthermore, security tokens have long been in use to provide additional security. The function of a security token is to authenticate either the token itself or the individual, hardware, or other entity associated with the token. Often, an authentication token will contain numerous authenticating indicia, some of which are used to authenticate the token and some of which are used for other authentication purposes.

However, a problem common to security-based systems and security authentication tokens is the vulnerability of the security functionality. Compromise of the integrity of the software or the confidentiality of the tokens results in system failures or worse abuses such as fraud. This is a major concern, since attackers using sophisticated techniques have compromised a wide variety of existing systems, resulting in the intercepting, corrupting or publishing of sensitive data. Therefore, there is a continuing need to include adequate security mechanisms to protect such systems and tokens.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a system that facilitates secure token generation and transmission capabilities in a mobile device. The system comprises at least one software application that includes a secure token assigned to a specific user and a memory module that communicates with an external processor. A security processor, non-volatile memory component and volatile memory component are integrated to form the memory module that communicates with the external processor. The memory module creates a secure execution environment for the execution of application agents associated with the software application and the secure token. The security processor of the system communicates with the software application and external processor to manage generation, authentication, and transmission of the secure token.

Further, the non-volatile memory component can be divided into multiple partitions of varying sizes and access rights. Accordingly, the software application is stored in a first partition, the application agents of the software application are stored in a second partition, and the secure token is stored in a third partition. If the secure token utilizes a secret key, such that a new authentication code is generated at specific time intervals based on a built-in clock, the authentication codes are stored in a fourth partition. And, if the secure token is used in combination with a one-time password list, the one-time password list is stored in a fifth partition of the non-volatile memory component. Alternatively, the authentication codes and/or one-time password list could all be stored together with the secure token in the third partition. As the security processor controls the entire non-volatile memory storage and monitors all traffic to and from the non-volatile memory components, the security processor is able to manage authentication, integrity, confidentiality, and non-repudiation of the secure tokens stored in the non-volatile memory component and executing within the secure execution environment.

In another aspect of the claimed subject matter, a secure channel of communications is established between the non-volatile memory component and the external processor or server. The external processor and/or server are mutually authenticated with the non-volatile memory component via shared key authentication or public key infrastructure (PKI) authentication. Once the external processor and the non-volatile memory component are mutually authenticated, a session key is generated allowing a secure channel of communication to be established between the non-volatile memory component and the external processor. The secure token is then transmitted via the secure channel communication. And, once the server and the non-volatile memory component are mutually authenticated, a session key is generated allowing a secure channel of communication to be established between the non-volatile memory component and the server. The secure token is then transmitted via the secure channel communication.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Additionally, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer-readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Security is imperative for network-based systems, particularly for applications that deal with sensitive information, to prevent unauthorized agents, in the form of hardware and/or software, from intercepting, corrupting or publishing sensitive data. As stated supra, suitable information security systems must perform with minimum disruption to users to ensure that authorized users are neither erroneously denied access nor unduly burdened or restricted in their capabilities. Accordingly, the following subject matter optimizes processor utilization and creates a heightened level of security in user applications.

A memory module that facilitates integrated security capabilities in a mobile device is disclosed. The memory module arbitrates with an external processor located outside of the memory module for access to the non-volatile memory. Software applications, application agents and secure tokens are stored in the non-volatile memory. Software applications are executed via the external processor in a less secure environment outside of the memory module and application agents and associated secure tokens are executed and handled by the security processor in a secure environment created by the memory module. By executing this capability within the secure execution environment, the integrity, authenticity, and confidentiality of the secure token is preserved and protected while in the mobile device as well as during transmission via secure channel communication capabilities provided by the secure non-volatile memory module.

Figure 1:
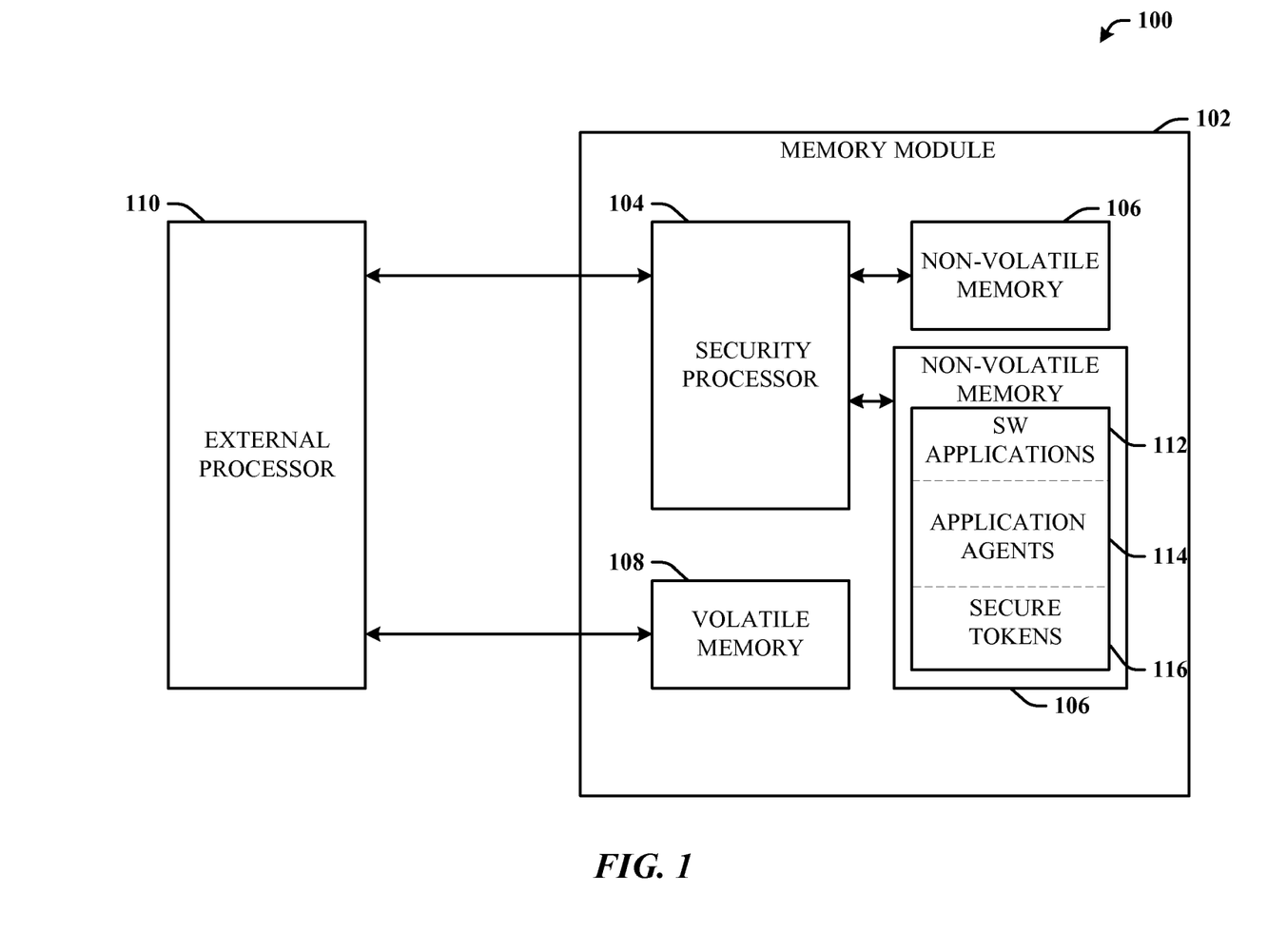
FIG. 1 illustrates a block diagram of a system that facilitates secure token generation and transmission capabilities in a mobile device.

Referring initially to the drawings, FIG. 1 illustrates a system 100 that integrates secure token generation capabilities into a mobile device in accordance with an innovative aspect. The system 100 includes a memory module 102 that creates a secure execution environment for running application agents and secure tokens. The memory module 102 is a package containing one or multiple chips of integrated circuits or semiconductors, wherein one integrated circuit houses a security processor 104 and another integrated circuit houses non-volatile memory 106. The integrated circuits are then coupled together to form the memory module 102. Optionally, the security processor 104 and the non-volatile memory 106 could be housed on one integrated circuit or piece of silicon. The non-volatile memory 106 is typically flash memory, but can be any type of non-volatile memory typically used for the task of secondary storage, or long-term persistent storage. Furthermore, one or more non-volatile memory 106 components can be included in the memory module 102. If more than one non-volatile memory 106 component is included, the non-volatile memory 106 component is not required to be of the same type and/or density.

Typically, the non-volatile memory 106 of the memory module 102 is divided into secure memory partitions of varying sizes and access rights. However, the non-volatile memory 106 is not required to be divided into multiple partitions and can function without the partitions. Secure partitioning is utilized to protect essential data and code, secure sensitive information, and allow easy access to common public data. Secure partitioning allows separate access controls to different partitions of code and data which could be made available based on user, service provider, original equipment manufacturer (OEM), enterprise authentication, or any other type of authentication available. The access controls distinguish between read and write (or erase) permissions and the descriptions of the owners who have the ability to change the access control. Specifically as illustrated in FIG. 1, the non-volatile memory 106 is divided into multiple partitions with associated access rights, wherein one partition stores the software applications 112, a second partition stores the application agents 114 associated with the software applications, and a third partition stores the secure tokens 116 associated with the software applications.

Software applications comprise secure tokens for authentication purposes. Secure tokens may be physical devices that an authorized user of computer services is given to aid in authentication, or the secure token could refer to a software token associated with a particular software application. Typically, the secure token is an RSA mechanism that generates a different authentication code at specific time intervals, (e.g., every sixty seconds). The secure token utilizes a built-in clock or time stamp and a factory-encoded random key to generate the different authentication codes. Or, the secure token could utilize a one-time password list. A one-time password list is a password that changes after each login, or changes after a set time interval. If the secure token utilizes a one-time password list, the password list would be securely stored in a partition of the non-volatile memory 106, as well.

As stated supra, software applications, associated application agents and secure tokens are stored in the non-volatile memory 106 of the memory module 102. However, application agents and secure tokens of the software applications stored within the non-volatile memory 106 are executed in the secure environment created by the memory module 102 via the security processor 104. In contrast, software applications stored within the non-volatile memory 106 are executed by the external processor 110 in a less secure environment outside of the memory module. By executing and handling the application agents and secure tokens within the secure execution environment, the integrity, authenticity and confidentiality of the secure token is preserved and protected while in the mobile device as well as during transmission via secure channel communication capabilities provided by the secure non-volatile memory 106.

As shown in FIG. 1, the memory module 102 also includes volatile memory or random access memory (RAM) 108 used for the temporary data and code storage needs of the external processor 110. Accordingly, the security processor 104 controls the entire flash memory storage and monitors all traffic to and from the non-volatile memory components 106. Further, the security processor 104 provides for concurrent processing of security protocols creating the secure execution environment within the memory module 102. The memory module 102 and external processor 110 are integrated to form a mobile device, wherein the memory module 102 is directly embedded into the mobile device. The mobile device includes a multimedia player, a Personal Digital Assistant (PDA), a cellular phone, a hand held computing device, or any other similar wireless computing device.

Further, the memory module 102 communicates with an external or host processor 110 via one or more communication busses, to facilitate the integrated security capabilities. The communication bus could be a NOR or NAND bus or both or a single bus which enables a NOR or NAND Interface. If more than one bus is utilized, both can be functioning in parallel. The external processor 110 is a typical applications processor that handles communications and runs applications. The external processor 110 can be a baseband processor or application processor for a mobile handset, personal data assistant (PDA), or the like.

As the secure tokens and application agents are stored in the secure non-volatile memory 106 and executed in the secure execution environment via the security processor 104, the system creates a tight coupling between the secure non-volatile memory 106 and the secure execution environment allowing for enhanced security for the storage, generation, transmittal and authentication of secure tokens. As stated supra, the security processor 104 controls the entire non-volatile memory storage and monitors all traffic to and from the non-volatile memory components 106, such that the security processor 104 is able to manage authentication, integrity, confidentiality, and non-repudiation of the secure tokens stored in the non-volatile memory 106 and executing within the secure execution environment.

Figure 2:
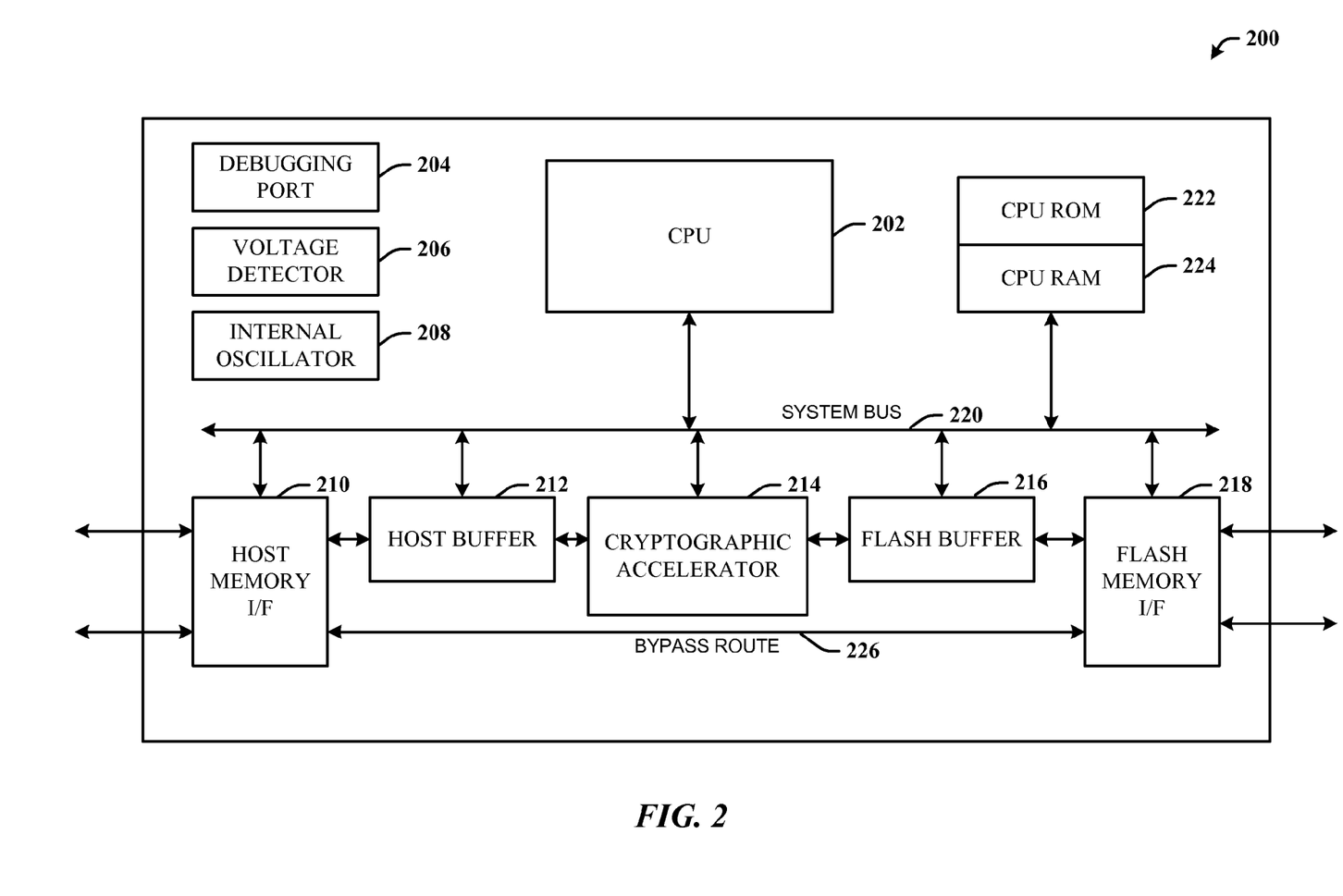
FIG. 2 illustrates a block diagram of a security processor of a memory module of the present system.

In more detail, FIG. 2 illustrates the components of a security processor 200. The security processor 200 includes a central processing unit (CPU) 202 or any other type of low power application processor. The CPU 202 within the security processor 200 can manage the flash memory storage (not shown) and provide a secure environment to implement authentication algorithms and security software. The security processor 200 also includes a Joint Test Action Group (JTAG) port 204 for debugging the system with a mechanism to prevent tampering, a voltage detector 206 that indicates the voltage level of the security processor 200 and stops the memory module from functioning when voltage levels are outside of the acceptable range in order to prevent side channel attacks, and an internal oscillator 208 that provides a clock for the security processor 200. This clock may be exported in its present form or may be divided to provide the clock signal for other components such as a fingerprint sensor. However, other mechanisms (not shown) can be provided that help prevent tampering. For example, temperature detecting, metal overlay (to hide signals), and scrambling of signals are additional methods that can be utilized in the security processor 200. A host memory interface (I/F) 210 handles all the flash memory transactions with a host processor and receives and transmits messages to the external processor or host processor (not shown). Specifically the host memory I/F 210 manages signaling, thus complying with the interface definitions of the flash memory. The host memory I/F 210 also manages interpretation or differentiating between a secure and non-secure request, and monitors requests to the flash memory to enforce access rights and permissions.

A host buffer 212 holds data for secured transactions to and from the host processor. The buffer 212 also serves as a mailbox between the CPU 202 and the host processor, wherein interpretation of the messages is carried out by the CPU 202. A cryptographic accelerator 214 that performs all the cryptographic algorithms, symmetric and a-symmetric needed by the system. The CPU 202 configures the cryptographic accelerator 214 and can control the data flow through the security processor 200. The CPU 202 interfaces a system bus 220 and the security applications that run on the CPU 202, arbitrating with the host processor. A flash buffer 216 holds data as it travels to and from the non-volatile memory or flash memory. The flash buffer 216 enables processing of a page while receiving the next page. A flash memory I/F 218 that handles all transactions to and from the flash memory storage and the security processor 200, such as signaling and interpretation.

A system bus 220 that allows the CPU 202 to communicate with the different components of the security processor 200. CPU ROM/RAM 222 and 224 contains code and data used by the CPU 202. The ROM 222 stores the CPU boot loader (not shown). Further, resident code and code overlays execute from the integrated CPU RAM 224, and are used for temporary data storage needs of the CPU 202. In operation, the host processor communicates with the security processor 200 and accesses the flash memory directly via a bypass route 226. Or, the host processor can communicate via the memory manager (not shown) running on the security processor 200 and access the flash memory through communications with the memory manager. In either case, access rights are enforced by the security processor 200 according to the security software embedded in the flash memory and the hardware design of the security processor 200.

Figure 3:
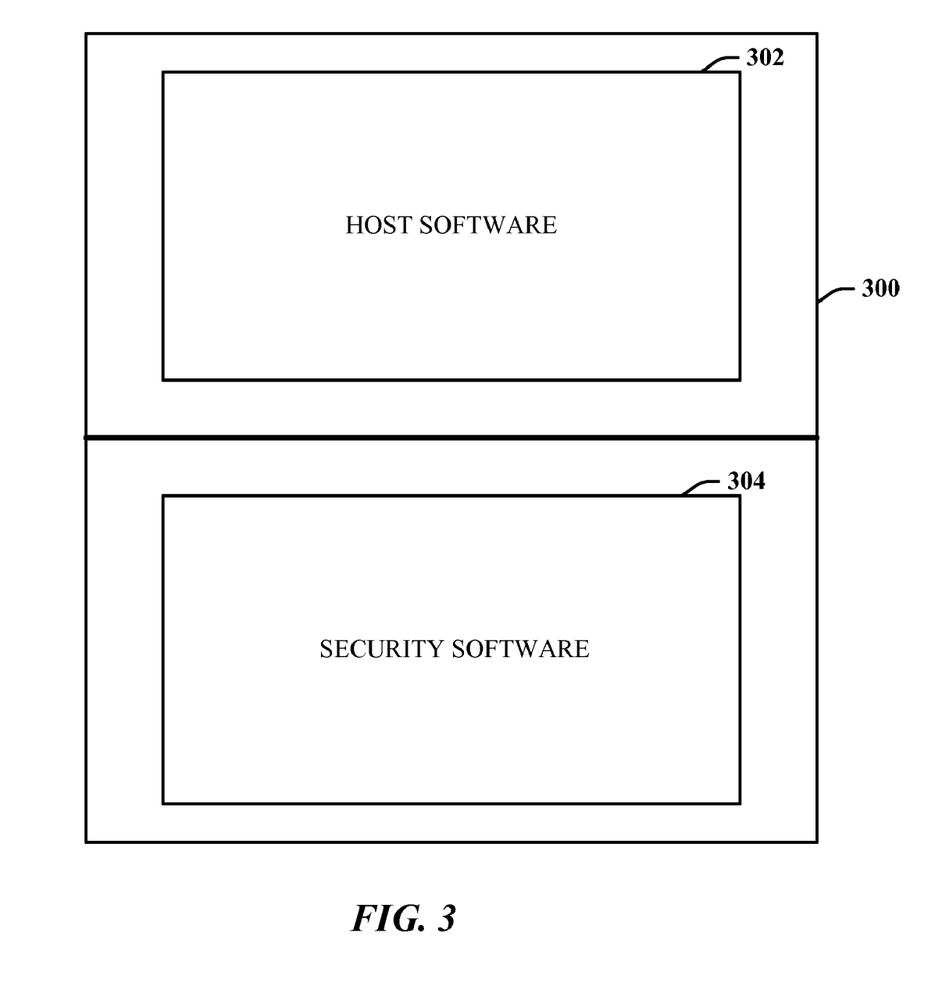
FIG. 3 illustrates a block diagram of a partitioned non-volatile memory component of the present system.

FIG. 3 illustrates non-volatile or flash memory 300 divided into secure memory partitions to store the host software 302 and security software 304. The host software 302 includes the host operating system and any software applications and secure token applications associated with the host or external processor (not shown). The security software 304 includes the application agents of the host software 302 and the application agents of the secure tokens. The application agents of the host software 302 and secure tokens are executed in the secure environment created by the security processor. The applications of the host software 302 work with the application agents and secure tokens running on the secure environment, allowing the security processor (not shown) to manage authentication, integrity, confidentiality and non-repudiation of the software applications.

Figure 4:
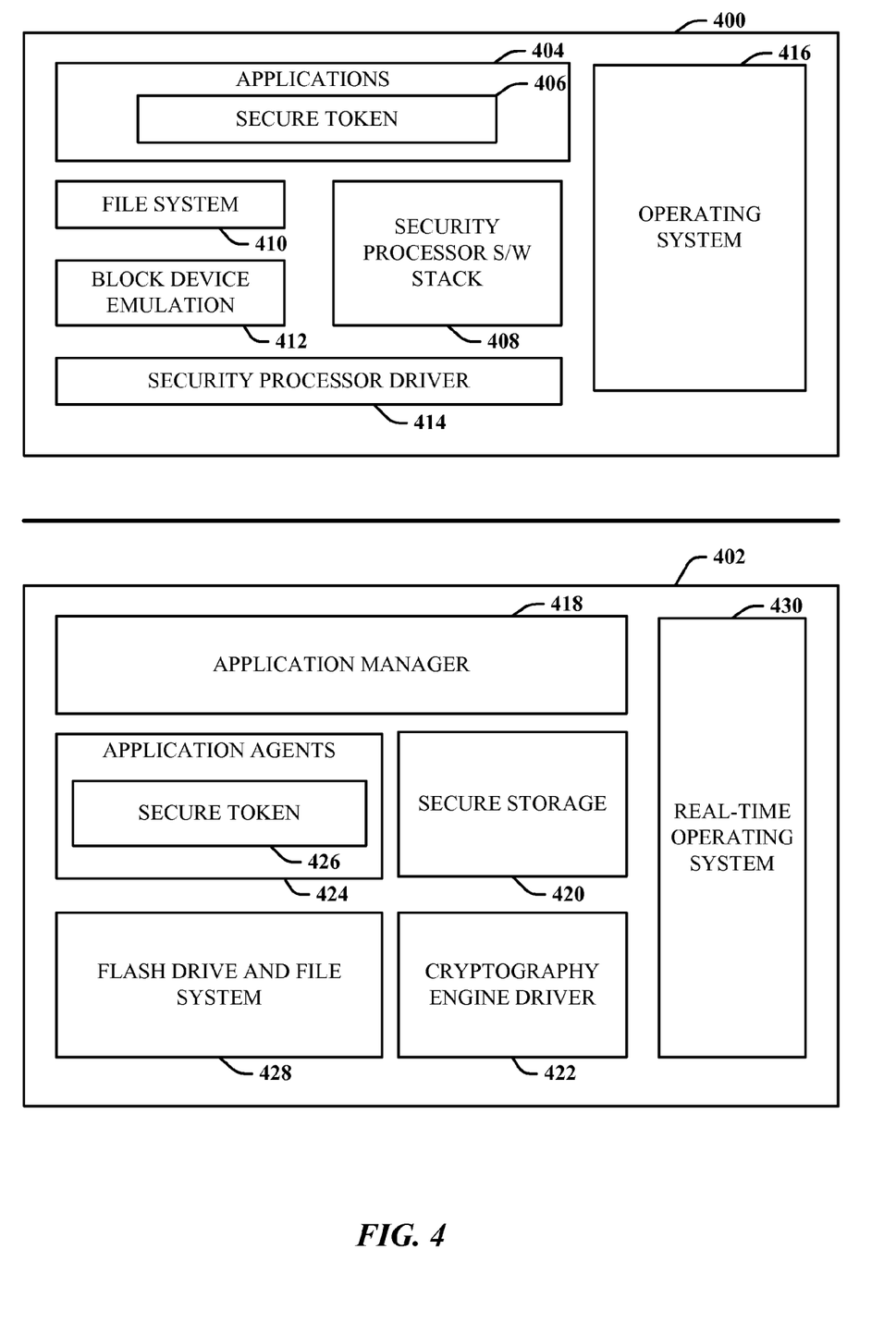
FIG. 4 illustrates a block diagram of a detailed partitioned non-volatile memory component.

Further, as shown in FIG. 4, host software 400 stored in the non-volatile memory includes software applications 404 that contain at least one secure token application 406 for performing two-factor authentication from a user to a network resource. As stated supra, the secure token 406 may be a physical device that an authorized user of computer services is given to aid in authentication, or the secure token could refer to a software token associated with a particular software application. Typically, the secure token is an RSA mechanism that generates a different authentication code at specific time intervals, (e.g., every sixty seconds). The secure token utilizes a built-in clock or time stamp and a factory-encoded random key to generate the different authentication codes. Or, the secure token could utilize a one-time password list. A one-time password list is a password that changes after each login, or changes after a set time interval.

The host software 400 also includes a security processor software stack 408 that provides an enriched application programming interface (API) to facilitate porting of third party software applications. A file system 410 stores and files the software applications and a block device emulation 412 acts as a hardware emulator to abstract the files to run on a platform other than the one for which they were originally written, so that the software applications can be read by the file system. The host software 400 also includes a security processor driver 414 that hides all the details of the device, implements a messaging interface, supports communications between the application and its secure agent and simplifies porting of file systems and block device emulation. Finally, an operating system 416 is also included in the host software 400 for managing the hardware and software resources of the applications.

FIG. 4 also depicts the security software 402 stored on the non-volatile memory. The security software 402 includes an application manager 418 that routes messages to the application agents. The security software 402 also includes a secure storage 420 that manages partitioning and access control of the non-volatile memory, and a cryptography engine driver 422 that provides for encryption and PKI authentication for secure channel communications. The security software 402 includes application agents 424 that work with their corresponding applications 404, the application agents 424 are executed in the secure environment created by the security processor. The application agents 424 also include application agents for the secure token applications 426. Further, the security software 402 includes a flash file system and flash drive 428 that stores the application agents and secure tokens in the secure executing environment. Finally, a real-time operating system 430 is included in the security software 402.

Figure 5:
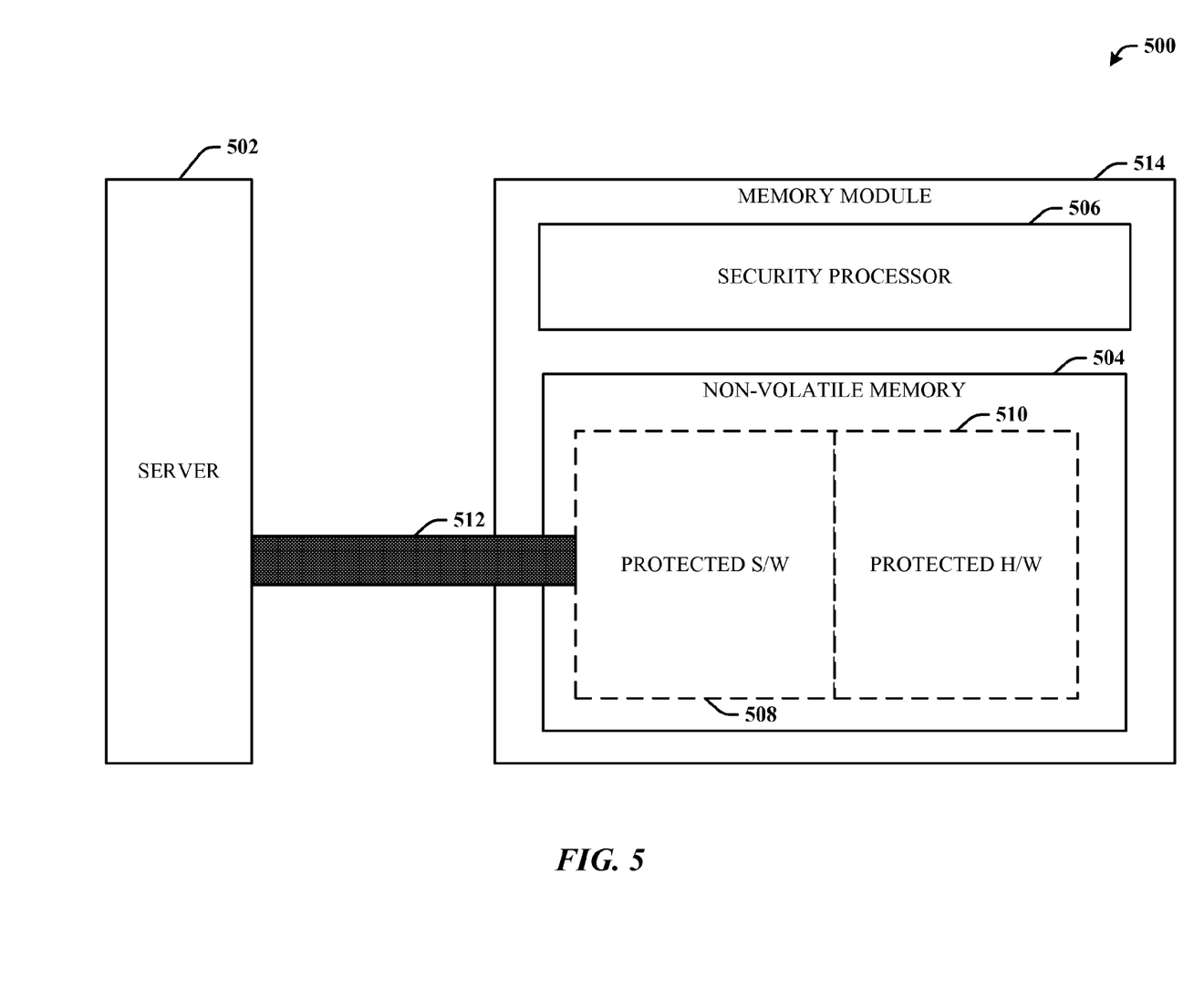
FIG. 5 illustrates a block diagram of a secure channel communication between the non-volatile memory and a server.

In another embodiment as illustrated in FIG. 5, a system 500 for establishing a secure channel of communications is shown. A secure channel of communications can be established when a user of a mobile device attempts to download a secure token from a content provider and/or service provider. A secure channel of communications can also be established if a user is attempting to connect to a virtual private network (VPN) or other network through the mobile device. Before a secure channel of communications can be established, mutual authentication between the server 502 and/or external processor (not shown) and non-volatile memory 504 must be established. Mutual authentication can occur in either of two ways, via public key infrastructure (PKI) authentication or shared key authentication. In either way, a session key is generated for establishing secure channel communications between the server 502 and the non-volatile memory 504. A session key is a key used for encrypting one message or a group of messages in a communication session.

Data in the form of protected software and hardware 508 and 510 is requested by an external server 502. The protected software and hardware 508 and 510 is stored in the non-volatile memory 504 of the memory module 514, such that the server 502 must be authenticated and a secure channel of communications must be established before the data can be transmitted. After mutual authentication between the server 502 and the non-volatile memory 504, a session key is generated and the security processor 506 encrypts and authenticates the protected software and hardware 508 and 510 with the session key. The security processor 506 then sends the protected software and hardware 508 and 510 to the server 502, where the server 502 decrypts the protected software and hardware 508 and 510 with the session key and checks for integrity.

The server 502 then processes the information and encrypts and authenticates new data with the session key and sends the new data to the security processor 506. The security processor 506 decrypts the new data with the session key and checks the integrity of the new data. Once the integrity is verified, a secure channel 512 is derived by using the session key for exchanging data between the server 502 and the non-volatile memory 504. The encryption with authentication provides the necessary security. Once the secure channel 512 is established, read/write access is granted to the server 502 and malicious software/agents (not shown) are prevented from read and/or write access of the protected software and hardware 508 and 510.

Figure 6:
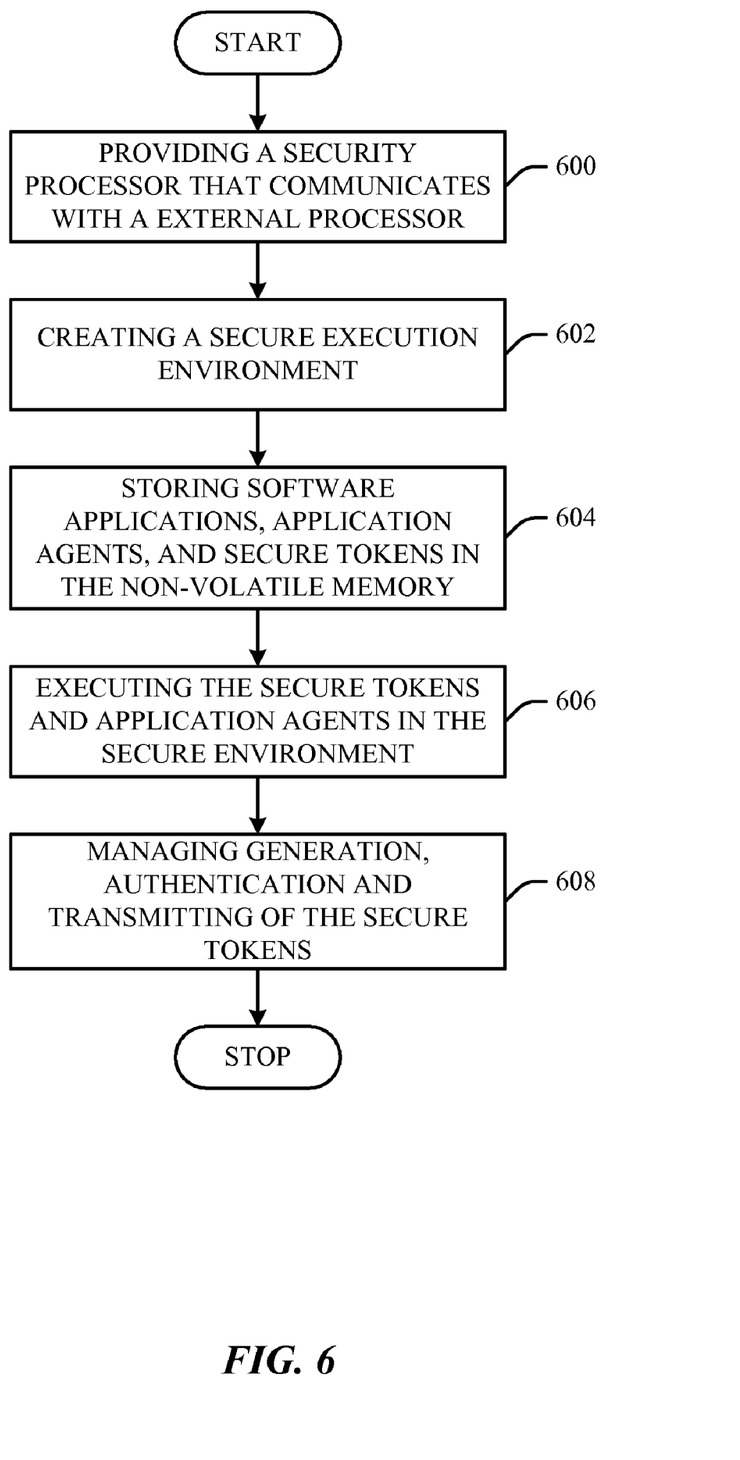
FIG. 6 illustrates a flow chart of a method of integrating secure token generation capabilities into a mobile device.
Figure 7:
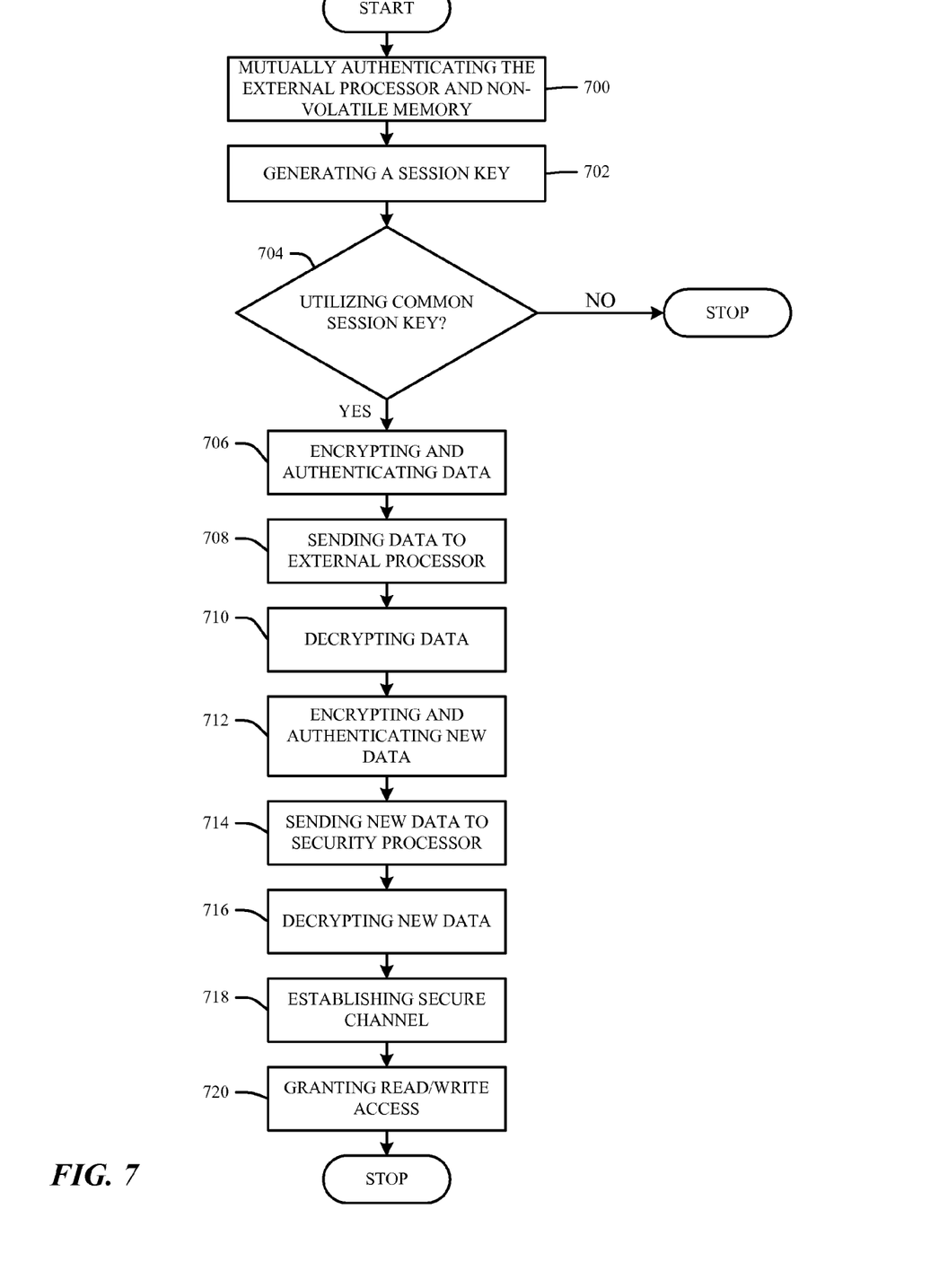
FIG. 7 illustrates a flow chart of a method of establishing a secure channel of communication between the non-volatile memory and the external processor.
Figure 8:
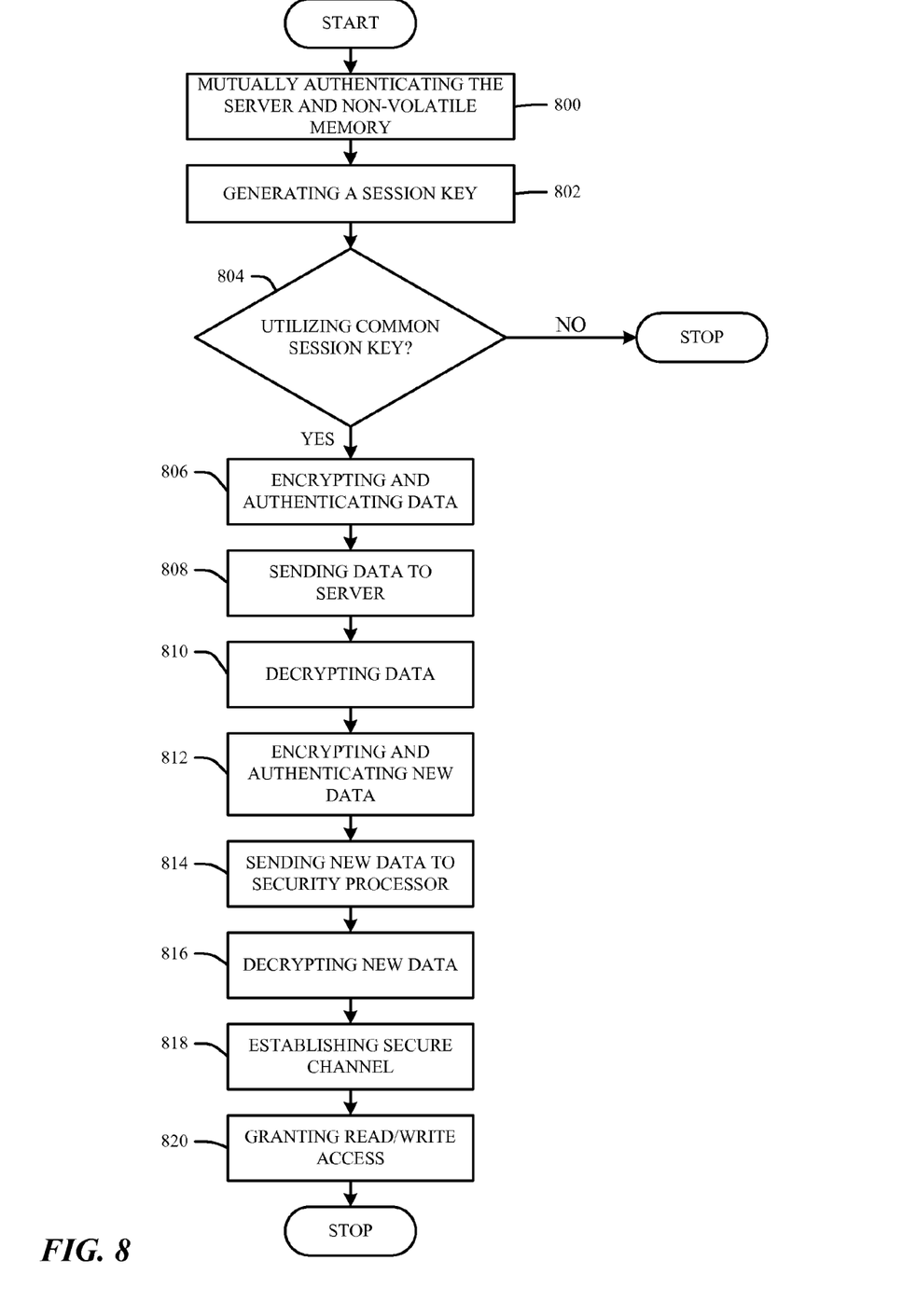
FIG. 8 illustrates a flow chart of a method of establishing a secure channel of communication between the non-volatile memory and a server.

FIGS. 6-8 illustrate methodologies of integrating secure token generation capabilities into a mobile device according to various aspects of the innovation. While, for purposes of simplicity of explanation, the one or more methodologies shown herein (e.g., in the form of a flow chart or flow diagram) are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Referring to FIG. 6, a method of integrating secure token generation capabilities into a mobile device is illustrated. At 600, a security processor is provided that communicates with an external processor. At 602, a secure execution environment is created by integrating the security processor with a non-volatile memory component to form a memory module. The memory module is a package containing one or multiple chips of integrated circuits or semiconductors, wherein one integrated circuit houses the security processor and another integrated circuit houses the non-volatile memory. The integrated circuits are then coupled together to form the memory module. Optionally, the security processor and the non-volatile memory could be housed on one integrated circuit or piece of silicon.

At 604, software applications, application agents and secure tokens are stored in the non-volatile memory component. The software applications comprise at least one secure token assigned to a specific user. The secure token may be a physical device that an authorized user of computer services is given to aid in authentication, or the secure token could refer to a software token associated with a particular software application. Typically, the secure token is an RSA mechanism that generates a different authentication code at specific time intervals, (e.g., every sixty seconds). The secure token utilizes a built-in clock or time stamp and a factory-encoded random key to generate the different authentication codes. Or, the secure token could utilize a one-time password list. A one-time password list is a password that changes after each login, or changes after a set time interval.

Further, the non-volatile memory component can be divided into multiple secure memory partitions. Secure partitioning is utilized to protect essential data and code, secure sensitive information, and allow easy access to common public data. Secure partitioning allows separate access controls to different partitions of data which could be made available based on user, service provider, OEM, enterprise authentication, or any other type of authentication available. The access controls distinguish between read and write (or erase) permissions and the descriptions of the owners who have the ability to change the access control. Specifically, the non-volatile memory component is divided into multiple partitions with associated access rights, wherein a first partition stores the software applications, a second partition stores the application agents associated with the software applications, and a third partition stores the secure tokens associated with the software applications.

And at 606, the secure tokens and application agents associated with the software applications are executed in the secure environment created by the memory module. At 608, the security processor manages generation, authentication, and transmission of the secure tokens and application agents via controlling the entire non-volatile memory storage and monitoring all traffic to and from the non-volatile memory components.

The method of integrating secure token generation capabilities into a mobile device significantly enhances security for the storage, generation, transmittal and authentication of secure tokens due to the tight coupling of the secure non-volatile memory and the secure execution environment created by the memory module. By executing this capability within a secure execution environment, the integrity of the secure token is preserved and protected while in the mobile device as well as during transmission via secure channel communication capabilities provided by the secure non-volatile memory.

Secure channel communication capabilities can be established when a user of a mobile device attempts to download a secure token from a content provider and/or service provider. Secure channel communication capabilities can also be established if a user is attempting to connect to a VPN or other network through the mobile device.

Referring to FIG. 7, a method of establishing secure channel communication capabilities between an external processor and the non-volatile memory component is illustrated. Authentication services utilized by the memory module include shared key authentication and PKI authentication. At 700, the external processor and non-volatile memory component are mutually authenticated via shared key authentication or PKI authentication. At 702, a session key is generated via the authentication between the external processor and the non-volatile memory component. At 704, both the external processor and the non-volatile memory component utilize the generated, common session key if secure channel communication capabilities are needed. Specifically, at 706, the generated session key is utilized and the security processor encrypts and authenticates data with the session key. At 708, the security processor then sends the data to the external processor.

At 710, the external processor decrypts the data with the session key and checks for integrity. At 712, the external processor processes the information and encrypts and authenticates new data with the session key. At 714, the external processor then sends the new data to the security processor. And, at 716, the security processor decrypts the new data with the session key and checks the integrity of the data. Once the integrity is verified, at 718 a secure channel is derived by using the session key for exchanging data between the external processor and the non-volatile memory component. The encryption with authentication provides the necessary security. Once the secure channel is established, at 720 read/write access is granted to the external processor and malicious software/agents are prevented from read and/or write access.

Referring to FIG. 8, a method of establishing secure channel communication capabilities between a server and the non-volatile memory component is illustrated. Authentication services utilized by the memory module include shared key authentication and PKI authentication. At 800, the server and non-volatile memory component are mutually authenticated via shared key authentication or PKI authentication. At 802, a session key is generated via the authentication between the server and the non-volatile memory component. At 804, both the server and the non-volatile memory component utilize the generated, common session key if secure channel communication capabilities are needed. Specifically, at 806, the generated session key is utilized and the security processor encrypts and authenticates data with the session key. At 808, the security processor then sends the data to the server.

At 810, the server decrypts the data with the session key and checks for integrity. At 812, the server processes the information and encrypts and authenticates new data with the session key. At 814, the server then sends the new data to the security processor. And, at 816, the security processor decrypts the new data with the session key and checks the integrity of the data. Once the integrity is verified, at 818 a secure channel is derived by using the session key for exchanging data between the server and the security processor. The encryption with authentication provides the necessary security. Once the secure channel is established, at 820 read/write access is granted to the server and malicious software/agents are prevented from read and/or write access.

Figure 9:
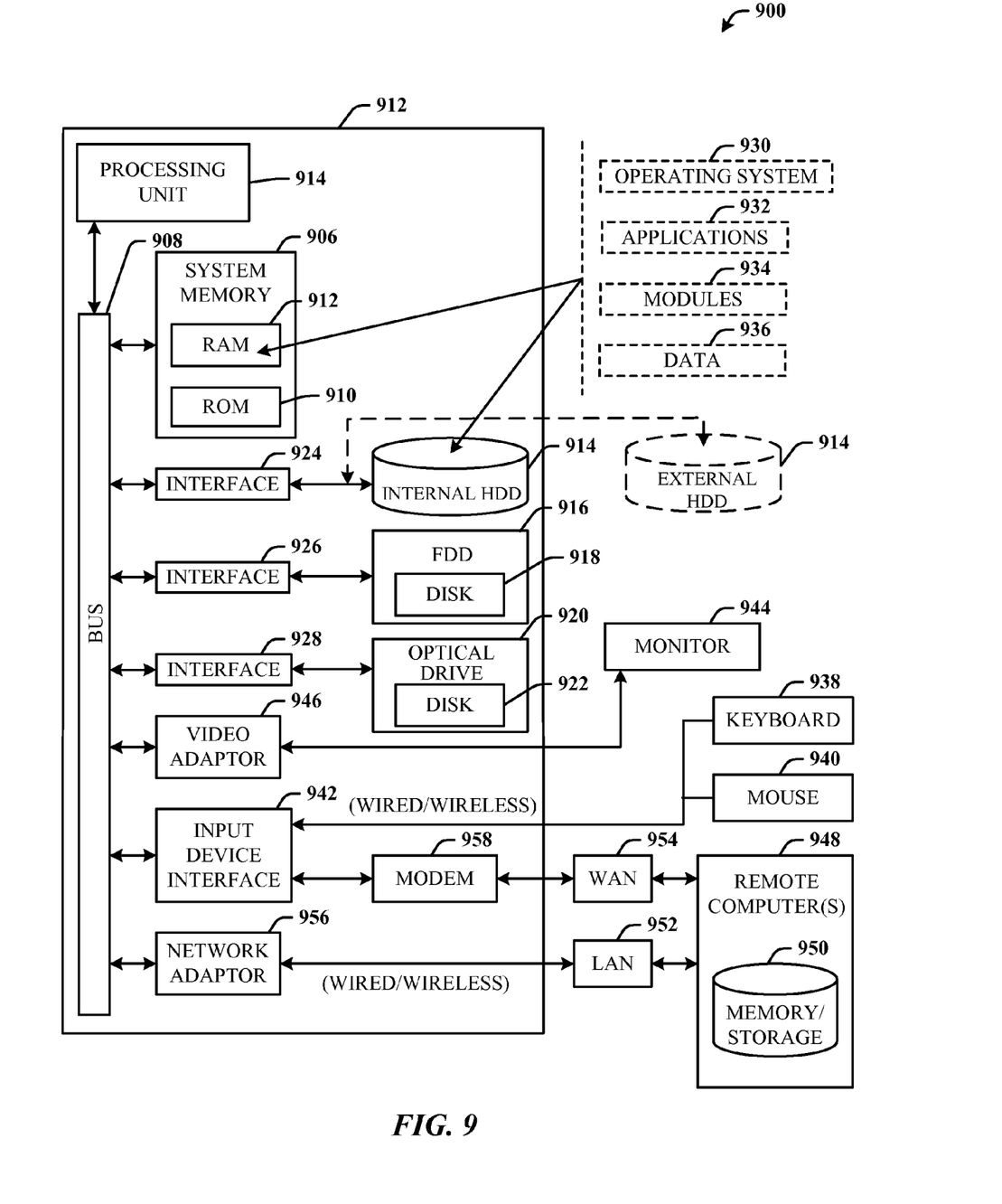
FIG. 9 illustrates a block diagram of a computer operable to execute the disclosed secure token generation and transmission capabilities architecture.

Referring now to FIG. 9, there is illustrated a block diagram of a computer operable to execute the disclosed secure token generation and transmission capabilities architecture. In order to provide additional context for various aspects thereof, FIG. 9 and the following discussion are intended to provide a brief, general description of a suitable computing environment 900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g. reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems.

A user can enter commands and information into the computer 902 through one or more wired/wireless input devices (e.g., a keyboard 938 and a pointing device, such as a mouse 940). Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks (e.g., a wide area network (WAN) 954). Such LAN and WAN networking environments are commonplace in offices and companies, and facilitate enterprise-wide computer networks, such as intranets, all of which may connect to a global communications network (e.g., the Internet).

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices (e.g., computers) to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
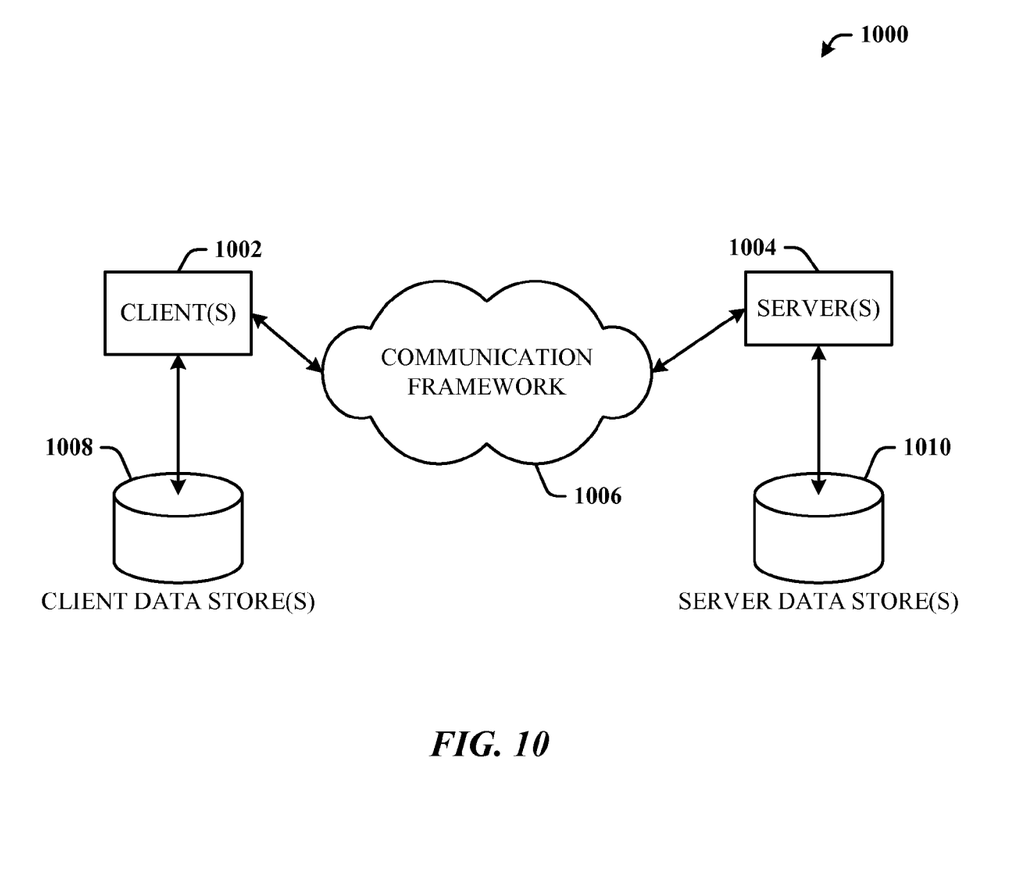
FIG. 10 illustrates a schematic block diagram of an exemplary computing environment for use with the secure token generation and transmission capabilities.

Referring now to FIG. 10, there is illustrated a schematic block diagram of an exemplary computing environment 1000 in accordance with another aspect. The system 1000 includes one or more client(s) 1002. The client(s) 1002 can be hardware and/or software (e.g., threads, processes, computing devices). The client(s) 1002 can house cookie(s) and/or associated contextual information by employing the subject innovation, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g. cookie(s) and/or associated contextual information). Similarly, the server(s) 1004 are operatively connected to one or more server data store(s) 1010 that can be employed to store information local to the servers 1004.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented system that facilitates secure token generation and transmission capabilities in a mobile device, comprising:

at least one host software application that comprises at least one secure token assigned to a specific user associated with the mobile device;

at least one non-volatile memory component contained in the mobile device and configured to communicate with a security processor; and the security processor, which is contained in the mobile device, and is configured to communicate with the at least one host software application to manage generation, authentication, and transmission of the at least one secure token, wherein the security processor is further configured to be integrated with the at least one non-volatile memory component in a secure execution environment within a memory module wherein the security processor is communicatively connected to the at least one non-volatile memory component and configured to be positioned in between the at least one non-volatile memory component and an external processor located outside of the memory module when the security processor is communicatively connected to the external processor to facilitate control of access to the at least one non-volatile memory component and information within the secure execution environment by the external processor, execute the at least one secure token and at least one application agent of the at least one host software application within the secure execution environment that has a higher level of security than a less secure environment accessible by the external processor, and establish a secure communication channel between the at least one non-volatile memory component and the external processor to facilitate transmission of the at least one secure token via the secure communication channel, wherein the at least one secure token is configured to include a built-in clock and utilize a secret key, and generate a new authentication code at specific time intervals based at least in part on the built-in clock and the secret key.

2. The system of claim 1, further comprising at least one volatile memory component configured to communicate with the external processor.

3. The system of claim 2, wherein the security processor, the at least one non-volatile memory component, and the at least one volatile memory component are integrated within the memory module configured to communicate with the external processor, the memory module is further configured to create the secure execution environment for the execution of the at least one secure token and the at least one application agent associated with the at least one host software application and the at least one secure token.

4. The system of claim 3, wherein the at least one non-volatile memory component is divided into multiple partitions of respective, varying sizes and respective, varying access rights, such that the at least one host software application is stored in a first partition associated with a first level of access rights, the at least one application agent of the at least one host software application is stored in a second partition associated with a second level of access rights, and the at least one secure token is stored in a third partition associated with a third level of access rights,
  wherein the first level of access rights, the second level of access rights, and the third level of access rights are different from each other, and
  wherein at least the second level of access rights provides a higher level of security to the at least one application agent stored in the second partition than the first level of access rights provides to the first partition.

5. The system of claim 4, wherein the at least one host software application further comprises a security processor driver configured to facilitate communications between the at least one host software application and the at least one application agent.

6. The system of claim 5, wherein the at least one host software application is configured to be executed via the external processor in the less secure environment outside of the memory module.

7. The system of claim 1, wherein the at least one application agent comprises a first application agent for use in relation to the at least one host software application and a second application agent that is a secure token application agent for use in relation to a secure token application, wherein the secure token application agent is used to facilitate secure execution of the at least one secure token within the secure execution environment and control of access to the at least one non-volatile memory component and information within the secure execution environment by the external processor.

8. The system of claim 1, wherein the at least one secure token is used in combination with a one-time password list, the one-time password list is stored securely within the at least one non-volatile memory component and contains a plurality of passwords, wherein each of the plurality of passwords is used one time, and wherein a current password of the plurality of passwords that is currently being used is changed to a different password of the plurality of passwords after each log-in or after a predetermined time interval has ended.

9. The system of claim 1, wherein the external processor or a server are respectively configured to be mutually authenticated with the at least one non-volatile memory component via shared key authentication or public key infrastructure (PKI) authentication.

10. The system of claim 9, wherein after the external processor and the at least one non-volatile memory component are mutually authenticated, the at least one secure token is configured to be transmitted via the secure communication channel established between the at least one non-volatile memory component and the external processor.

11. The system of claim 9, wherein after the server and the at least one non-volatile memory component are mutually authenticated, the at least one secure token is configured to be transmitted via the secure communication channel established between the at least one non-volatile memory component and the server.

12. The system of claim 1, wherein the mobile device comprises one of a multimedia player, a Personal Digital Assistant (PDA), a cellular phone, or a hand held computing device.

13. A method of integrating secure token generation capabilities into a mobile device, comprising:
  providing a security processor that communicates with an external processor;
  creating a secure execution environment via integrating the security processor together with at least one non-volatile memory component within a memory module, communicatively connecting the security processor to the at least one non-volatile memory component, and configuring the security processor to be positioned in between the at least one non-volatile memory component and the external processor when the security processor is communicatively connected to the external processor to facilitate controlling access to the at least one non-volatile memory component and information within the secure execution environment by the external processor, wherein the external processor is located outside of the memory module;
  storing at least one host software application, at least one application agent associated with the at least one host software application, and at least one secure token in the at least one non-volatile memory component;
  executing the at least one secure token and the at least one application agent associated with the at least one host software application and the at least one secure token in the secure execution environment, wherein the secure execution environment has a higher level of security than a less secure environment, wherein the less secure environment is accessible by the external processor;
  generating a new authentication code by the at least one secure token at specific time intervals using a built-in clock and a secret key;
  establishing a secure channel communication between the at least one non-volatile memory component and the external processor to facilitate transmitting the at least one secure token via the secure communication channel; and
  managing generation, authentication, and transmission of the at least one secure token.

14. The method of claim 13, further comprising:
  integrating the at least one non-volatile memory component, the security processor, and the external processor to form at least a portion of the mobile device, wherein the at least one non-volatile memory component and the security processor are embedded in the mobile device.

15. The method of claim 13, further comprising:
  mutually authenticating the at least one non-volatile memory component and the external processor; and
  establishing a secure communication channel between the at least one non-volatile memory component and the external processor for transmitting the at least one secure token.

16. The method of claim 13, further comprising:
  mutually authenticating the at least one non-volatile memory component and a server; and
  establishing a secure communication channel between the at least one non-volatile memory component and the server for transmitting the at least one secure token.

17. The method of claim 13, further comprising:
  employing a first application agent and a second application agent within the secure execution environment, wherein the at least one application agent comprises the first application agent for use in relation to the at least one host software application and a second application agent that is a secure token application agent for use in relation to a secure token application; and
  utilizing the secure token application agent to facilitate securely executing the at least one secure token within the secure execution environment and controlling access to the at least one non-volatile memory component and information within the secure execution environment by the external processor.

18. The method of claim 13, wherein the at least one secure token is used in combination with a one-time password list, the one-time password list is stored securely within the at least one non-volatile memory component and comprises a plurality of passwords, wherein each of the plurality of passwords is used one time, and wherein a current password of the plurality of passwords that is currently being used is changed to a different password of the plurality of passwords after each log-in to the memory module or after a predetermined time interval has ended.

19. The method of claim 13, further comprising:
providing volatile memory used for the temporary data and code storage needs of the external processor.

20. A system that integrates secure token generation capabilities into a mobile device, comprising:
means for providing a security processor configured to communicate with an external processor;
means for creating a secure execution environment via integrating the security processor with at least one flash memory component within a memory module by communicatively connecting the security processor to the at least one flash memory component and configuring the security processor to be positioned in between the at least one flash memory component and the external processor located outside of the memory module when the security processor is communicatively connected to the external processor to facilitate controlling access to the at least one flash memory component and information within the secure execution environment by the external processor;
means for storing at least one host software application, at least one application agent of the at least one host software application and at least one secure token in respective separate partitions of the at least one flash memory component;
means for executing the at least one secure token and the at least one application agent of the at least one host software application and in the secure execution environment, wherein the secure execution environment has a higher level of security than a less secure environment, wherein the less secure environment is accessible by the external processor;
means for generating a new authentication code for the at least one secure token at specific time intervals based at least in part on a built-in clock and a secret key utilized by the at least one secure token;
means for mutually authenticating the at least one flash memory component and the external processor; and
means for establishing a secure communication channel between the at least one flash memory component and the external processor for transmitting the at least one secure token via the secure communication channel.

* * * * *